US011859770B1

(12) United States Patent
John et al.

(10) Patent No.: US 11,859,770 B1
(45) Date of Patent: Jan. 2, 2024

(54) COMPRESSED GAS CYLINDER ACTUATION DEVICE

(71) Applicant: Goodrich Corporation, Charlotte, NC (US)

(72) Inventors: Poly John, Cochin (IN); Vasantha Kumara Jnanegowda, Bangalore (IN); Srijith Purushothaman, Thrissur (IN); Ashish Kumar Agarwal, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/951,782

(22) Filed: Sep. 23, 2022

(30) Foreign Application Priority Data

Jun. 14, 2022 (IN) ............................ 202241034027

(51) Int. Cl.
*F17C 13/06* (2006.01)
*F17C 13/04* (2006.01)
*A62B 7/02* (2006.01)

(52) U.S. Cl.
CPC .............. *F17C 13/06* (2013.01); *F17C 13/04* (2013.01); *A62B 7/02* (2013.01); *F17C 2205/0314* (2013.01); *F17C 2205/0332* (2013.01); *F17C 2260/036* (2013.01); *F17C 2260/037* (2013.01)

(58) Field of Classification Search
CPC .... F17C 2205/032; F17C 13/06; F17C 13/04; F17C 2205/0314; F17C 2205/0332; Y10T 137/1744; Y10T 137/1752; Y10T 137/1767
See application file for complete search history.

(56) References Cited

U.S. PATENT DOCUMENTS

| | | | | |
|---|---|---|---|---|
| 2,780,389 | A * | 2/1957 | Sandgren | F17C 13/002 137/68.13 |
| 2,958,545 | A * | 11/1960 | Stelzer | F16L 55/1007 285/119 |
| 3,521,786 | A * | 7/1970 | Szerejko | F17C 5/06 220/583 |
| 4,083,187 | A * | 4/1978 | Nagashima | F16K 17/403 60/407 |
| 5,411,225 | A | 5/1995 | Lannon et al. | |
| 8,863,743 | B2 | 10/2014 | Sitabkhan et al. | |
| 10,011,332 | B2 * | 7/2018 | Michalski | F17C 1/005 |
| 10,481,620 | B2 | 11/2019 | John et al. | |
| 11,092,252 | B2 | 8/2021 | John et al. | |

(Continued)

FOREIGN PATENT DOCUMENTS

| | | | | |
|---|---|---|---|---|
| FR | 2412771 | * | 7/1979 | |
| GB | 1383321 A | * | 2/1975 | F17C 7/00 |

*Primary Examiner* — Jessica Cahill
(74) *Attorney, Agent, or Firm* — SNELL & WILMER L.L.P.

(57) ABSTRACT

An actuator for opening a hermetically sealed cylinder is disclosed herein. The actuator includes an actuation chamber configured to receive pressurized gas, the actuation chamber at least partially defined by a top wall and a bottom wall, a cutter body disposed within the actuation chamber between the top wall and the bottom wall, the cutter body including a top portion and a bottom portion, a cutting edge extending from the bottom portion of the cutter body, and a spring disposed between the top portion of the cutter body and the bottom wall of the actuation chamber.

19 Claims, 6 Drawing Sheets

(56) References Cited

U.S. PATENT DOCUMENTS

| | | | | |
|---|---|---|---|---|
| 11,169,552 | B2 | 11/2021 | John et al. | |
| 11,311,760 | B2 | 4/2022 | Ryczek et al. | |
| 2018/0341279 | A1* | 11/2018 | John ...................... | B64D 25/14 |
| 2020/0326014 | A1 | 10/2020 | John et al. | |

* cited by examiner

COMPRESSED GAS CYLINDER ACTUATION DEVICE

CROSS-REFERENCE TO RELATED APPLICATIONS

This application claims priority to, and the benefit of, India Patent Application No. 202241034027 (DAS CODE: F0B2), filed Aug. 10, 2022, and titled "COMPRESSED GAS CYLINDER ACTUATION DEVICE," which is incorporated by reference herein in its entirety for all purposes.

FIELD

The present disclosure generally relates opening gas cylinders and, more specifically, to opening compressed gas cylinders.

BACKGROUND

Aircraft survival systems such as passenger emergency evacuation slides and life support oxygen systems use the pressurized gas stored in cylinders. Currently, compressed gas cylinders use a valve module that is directly assembled to the cylinder that allows the compressed gas to exit the cylinder. The valve may also be used to fill the cylinder with gas. However, the valve is prone to leaking air from the cylinder over time. Additionally, the valve is generally attached to the cylinder using a threaded interface and a static seal at the threaded interface that may be prone to leaking over time. Currently, regular maintenance is scheduled to overhaul and maintain the cylinder and valve including refilling the cylinder to compensate for the gas that has leaked. Maintenance may further involve replacing the static seals with new static seals. This maintenance increases the down time and cost of the compressed gas cylinders.

SUMMARY

An actuator for opening a hermetically sealed cylinder is disclosed herein. The actuator includes an actuation chamber configured to receive pressurized gas, the actuation chamber at least partially defined by a top wall and a bottom wall, a cutter body disposed within the actuation chamber between the top wall and the bottom wall, the cutter body including a top portion and a bottom portion, a cutting edge extending from the bottom portion of the cutter body, and a spring disposed between the top portion of the cutter body and the bottom wall of the actuation chamber.

In various embodiments, the actuation chamber is further defined by a sidewall extending from the top wall to the bottom wall and circumferentially around the cutter body and the top portion of cutter body contacts the sidewall of the actuation chamber. In various embodiments, the actuator for opening a hermetically sealed cylinder further includes an O-ring disposed circumferentially around the top portion of the cutter body and between the top portion of the cutter body and the sidewall of the actuation chamber. In various embodiments, the actuator for opening a hermetically sealed cylinder further includes a leak vent fitting extending through the sidewall and into the actuation chamber.

In various embodiments, the spring is configured to move from an uncompressed state to a compressed state in response to the cutter body moving in a first direction. In various embodiments, the cutter body moves in the first direction in response to a force exerted on the top surface of the cutter body. In various embodiments, the actuator for opening a hermetically sealed cylinder further includes a second cutting edge extending from the bottom portion of the cutter body, the second cutting edge separated from the cutting edge by a distance.

Also disclosed herein is a system including a cylinder having an opening, a fracture disk coupled to the cylinder and over the opening, and an actuator configured to break the fracture disk. The actuator includes an actuation chamber configured to receive pressurized gas, the actuation chamber is partial defined by a top wall and a bottom wall, a cutter body disposed within the actuation chamber between the top wall and the bottom wall, the cutter body including a top portion and a bottom portion, a cutting edge extending from the bottom portion of the cutter body and configured to break the fracture disk in response to moving in a first direction, and a spring disposed between the top portion of the cutter body and the bottom wall of the actuation chamber.

In various embodiments, the actuation chamber is further defined by a sidewall extending from the top wall to the bottom wall and circumferentially around the cutter body and the top portion of cutter body contacts the sidewall of the actuation chamber. In various embodiments, the actuator further includes an O-ring disposed circumferentially around the top portion of the cutter body and between the top portion of the cutter body and the sidewall of the actuation chamber.

In various embodiments, the system further includes a pressure cartridge disposed adjacent the actuator, the pressure cartridge configured to force pressurized gas into the actuation chamber. In various embodiments, the spring is configured to move from an uncompressed state to a compressed state in response to the pressurized gas in the actuation chamber moving the cutter body in the first direction. In various embodiments, the actuator further includes a second cutting edge extending from the bottom portion of the cutter body, the second cutting edge separated from the cutting edge by a distance. In various embodiments, the cylinder holds a second pressurized gas and the actuator further includes a gas outlet to vent the second pressurized gas from the cylinder in response to the fracture disk being broken.

Also disclosed herein is a system including a cylinder having an opening, a fracture disk coupled to the cylinder and over the opening, and an actuator configured to break the fracture disk. The actuator includes an actuation chamber configured to receive pressurized gas, the actuation chamber is partial defined by a top wall and a bottom wall, a cutter body disposed within the actuation chamber between the top wall and the bottom wall, the cutter body including a top portion and a bottom portion, a central stem extending through the cutter body and contacting the fracture disk, a cutting edge extending from the bottom portion of the cutter body and configured to break the fracture disk in response to moving in a first direction, and a spring disposed between the top portion of the cutter body and the bottom wall of the actuation chamber.

In various embodiments, the actuator further includes a second cutting edge extending from the bottom portion of the cutter body, wherein there is a distance between the cutting edge and the second cutting edge. In various embodiments, the central stem further extends between the cutting edge and the second cutting edge. In various embodiments, the actuator further includes a compression spring disposed between the central stem and the top wall of the actuation chamber.

In various embodiments, the fracture disk further includes a notch formed in a bottom surface of the fracture disk, the notch configured to be inline with the cutting edge. In various embodiments, the cutter body is configured to move independent of the central stem.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
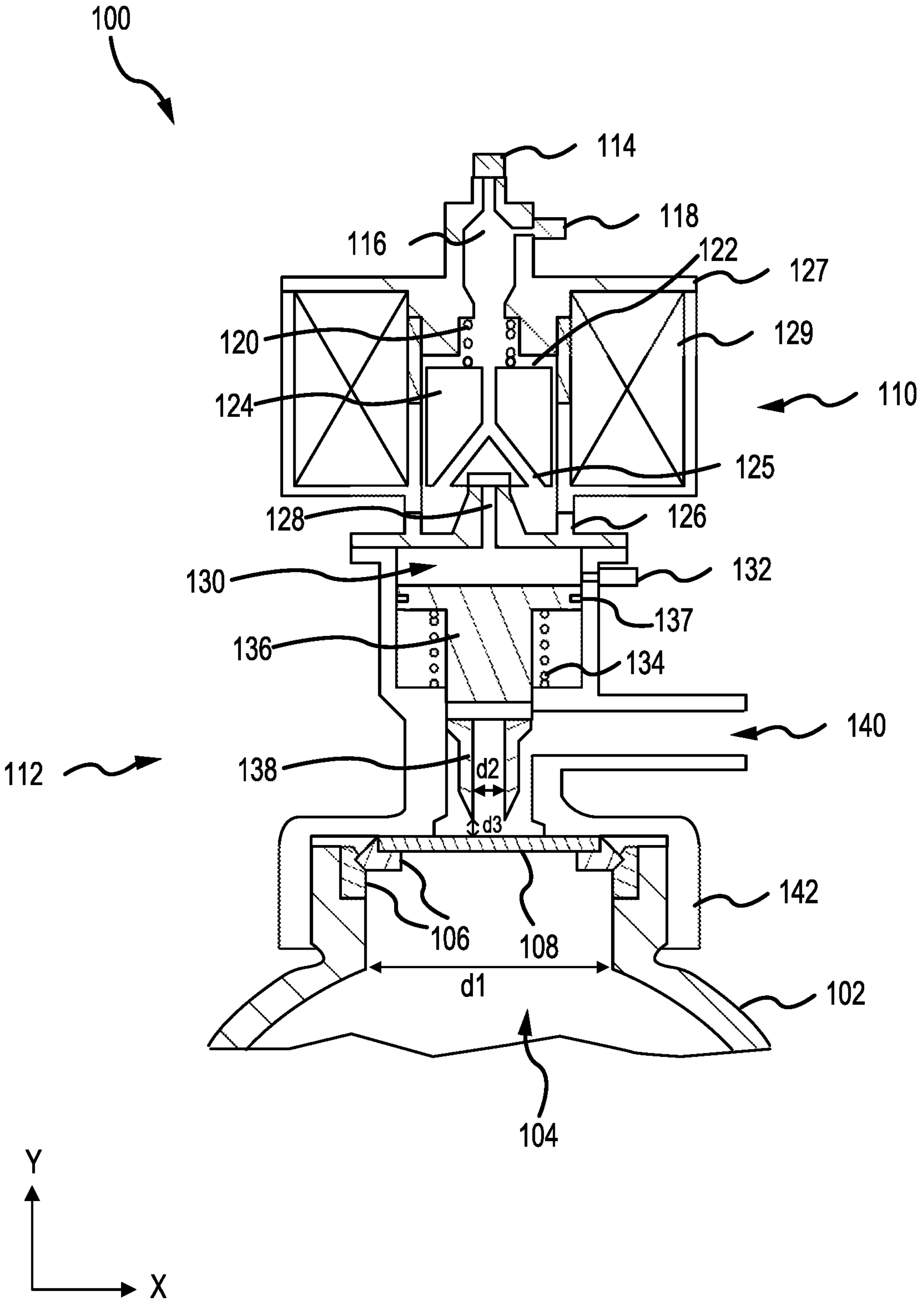
FIGS. 1A and 1B illustrate an actuation device for opening a pressurized cylinder, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

An actuation device for opening a hermetically sealed compressed gas cylinder is disclosed herein. The hermetically sealed compressed gas cylinders may be used aboard aircraft with inflatable evacuation slides, inflatable life rafts, and oxygen systems, among other uses. Accordingly, storage of the hermetically sealed compressed gas cylinder is designed for maximum service life with little to no leakage. The hermetically sealed compressed gas cylinder, in various embodiments, utilizes a welded construction including a thin metallic fracture disk, or diaphragm, to seal the cylinder. The fracture disk may be fusion or cold welded to the cylinder, in various embodiments. Gas is released from the compressed gas cylinder in response to the fracture disk being broken or opened. This reduces the need for or eliminates the static non-metallic seal that is commonly used in compressed gas cylinders aboard aircraft, exhibiting little to no leakage and reducing the need for or eliminating the use of elastomeric seals. In various embodiments, the hermetically sealed compressed gas cylinder may be filled from a port in the bottom of the cylinder or similar method. The port may be designed such that the cylinder is sealed after being filled.

In various embodiments, the actuation device disclosed herein uses a solenoid operated pressure cartridge to operate a cutter having a knife edge interface. In various embodiments, the cutter is assembled inside a manifold that is connected to the hermetically sealed compressed gas cylinder. In various embodiments, the cutter knife edge is initially located a distance away from the fracture disk. In various embodiments, the cutter knife edge is pushed toward the fracture disk in response to pressurized gas being released from the pressure cartridge by the solenoid. This ruptures the fracture disk and allows the gas in the hermetically sealed compressed gas cylinder to flow out.

As the size of the hermetically sealed compressed gas cylinder increases, the diameter of the fracture disk may increase. This may introduce a higher stress on the fracture disk causing the fracture disk to bulge or bow outward. In various embodiments, the actuation device may include a stem that interfaces with the fracture disk and counteracts the bulge of the fracture disk. In various embodiments, the stem may be spring loaded.

Figure 1B:
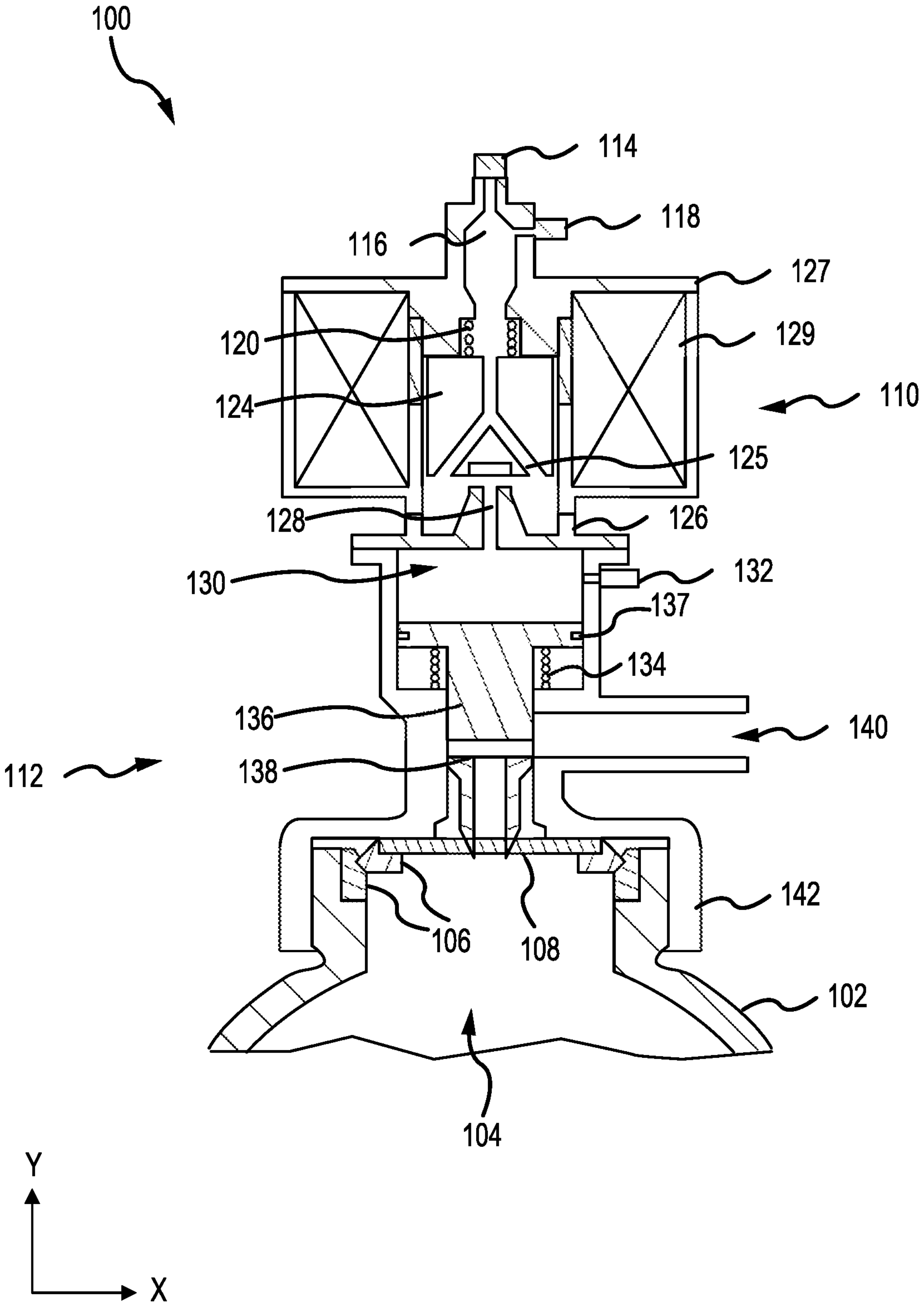

Referring now to FIGS. 1A and 1B, in accordance with various embodiments, cross section views of an actuation device 100 for opening a pressurized cylinder 102 is illustrated. FIG. 1A illustrates actuation device 100 in a closed position. FIG. 1B illustrates actuation device 100 in an open position. Pressurized cylinder 102 includes an opening 104, metal inserts 106, and a fracture disk 108. Metal inserts 106 are connected to opening 104 and around the circumference of opening 104. In various embodiments, metal inserts 106 may be welded to opening 104 of pressurized cylinder 102. Fracture disk 108, also referred to as a diaphragm, is connected to metal inserts 106. In various embodiments, metal inserts 106 may be formed of a single piece. In various embodiments, fracture disk 108 may be cold welded or fusion welded to metal inserts 106. In various embodiments, pressurized cylinder 102 is hermetically sealed. In various embodiments, pressurized cylinder 102 may be filled with pressurized gas from a bottom portion (e.g., the negative y-direction) of pressurized cylinder 102. Opening 104 has a diameter d1 that may be any suitable size for a pressurized cylinder. In various embodiments, diameter d1 may be about 3 cm (about 1.18 inches) to about 30 cm (about 11.8 inches), and more specifically, about 7 cm (about 2.76 inches) to about 15 cm (about 5.91 inches). Larger and smaller values for diameter d1 are contemplated.

Actuation device 100 includes a pressure cartridge 110 and a manifold 112, where the manifold 112 is connected to the pressurized cylinder 102. In various embodiments, manifold 112 is threaded onto pressurized cylinder 102.

Pressure cartridge 110 includes a fill valve 114, a pressure cavity 116, a pressure sensor 118, a spring 120, an air gap 122, a plunger 124, a bottom wall 126 (e.g., in the negative y-direction), and an upper wall 127 (e.g., in the positive y-direction). Fill valve 114 may be used to introduce air into pressure cavity 116 and pressurize the air in pressure cavity 116. In various embodiments, fill valve 114 may be a Schrader type valve. In various embodiments, fill valve 114 may be another type of valve used to fill a pressurized space, such as pressure cavity 116. Pressure sensor 118 monitors the air pressure in pressure cavity 116 and provides an indication of the readiness of actuation device 100 for use. In various embodiments, pressure sensor 118 may be a microelectromechanical system (MEMS) sensor, though other types of pressure sensors are contemplated. Spring 120 provides a downward force (e.g., the negative y-direction) on plunger 124, pressing plunger 124 onto bottom wall 126 thereby sealing pressure cartridge 110. Air gap 122 is formed between plunger 124 and upper wall 127.

FIG. 1A illustrates actuation device 100, and more specifically pressure cartridge 110, in a closed position. Actuation device 100 further includes electromagnets 129 disposed circumferentially around plunger 124. Plunger 124 and electromagnets 129 may form a solenoid for actuating actuation device 100. Electromagnets 129 engage in response to an electric current being provided. Plunger 124 is drawn upward (e.g., in the y-direction), pressure cartridge 110, in response to electromagnets 129 engaging. Plunger 124 compresses spring 120, closing air gap 122, to open pressure cartridge 110 in response to being drawn upward (e.g., in the y-direction). FIG. 1B illustrated actuation device 100, and more pressure cartridge 110, in an open position. In the open position, pressurized air in pressure cavity 116 pass through an air channel 125 in plunger 124 and through an air channel 128 in bottom wall 126, exiting pressure cartridge 110 and into manifold 112.

Manifold 112 includes an actuation chamber 130, a leak vent fitting 132, a compression spring 134, a cutter body 136, one or more cutting edges 138, and an air outlet 140 within a manifold body. Pressurized air flows into actuation chamber 130 from pressure cartridge 110 through air channel 128. The pressurized air exerts a downward force (e.g., in the negative y-direction) on cutter body 136, thereby compressing compression spring 134 and pushing the one or more cutting edges 138 through fracture disk 108. Pressurized air in pressurized cylinder 102 exerts an upward force (e.g., in the y-direction) on cutter body 136, opening air outlet 140, and allowing the pressurized air from pressurized cylinder 102 to flow out air outlet 140. An O-ring seal 137 may be placed around cutter body 136 to seal actuation chamber 130 and prevent air from leaking between manifold body 142 and cutter body 136.

Leak vent fitting 132 decreases the chance of an inadvertent actuation of cutter body 136 by venting gasses that are leaked into actuation chamber 130 from pressure cartridge 110. Leak vent fitting 132 vents air from actuation chamber 130 in response to the air being below an actuation pressure Pa. When pressure cartridge 110 is in the closed state, air may leak into actuation chamber 130 and leak vent fitting 132 may vent the air after reaching a leak pressure Pi but before reaching the actuation pressure Pa. That is, leak vent fitting 132 is able to vent air slowly entering actuation chamber 130. When pressure cartridge 110 is in the open state, leak vent fitting 132 may vent air but not quick enough to keep the air pressure in actuation chamber below actuation pressure Pa. That is, pressurized air quickly fills actuation chamber 130 in response to pressure cartridge being activated.

Cutting edges 138 are separated from one another by a distance d2. In various embodiments, distance d2 may be about 1 cm (about 0.394 inch) to about 5 cm (about 1.97 inches), and more specifically, about 2 cm (about 0.787 inch) to about 4 cm (about 1.57 inches). In various embodiments, distance d2 may be a percentage of d1 where d2 is about 10% to about 30% of d1, and more specifically, about 15% to about 20% of d1. Cutting edges 138 are separated from fracture disk 108 a distance d3 (e.g., in the y-direction). Distance d3 may be about 0.5 cm (about 0.197 inch) to about 5 cm (about 1.97 inches), and more specifically, about 1 cm (about 0.394 inch) to about 2 cm (about 0.787 inch). Distance d3 lessens the chances of cutting edges 138 inadvertently puncturing, or breaking, fracture disk 108. Compression spring 134 further lessens the chances of cutting edges 138 inadvertently puncturing fracture disk 108.

FIG. 1A illustrates actuation device 100, and more specifically manifold 112, in the closed position with cutting edges 138 above (e.g., in the negative y-direction) fracture disk 108 distance d3. Leak vent fitting 132 vents any air leaked into actuation chamber 130 prevent actuation of cutter body 136, and more specifically, cutting edges 138. FIG. 1B illustrates actuation device 100, and more specifically manifold 112, in the open position with cutting edges 138 pushed through fracture disk 108. In the open position, cutting edges 138 break through fracture disk 108 thereby opening pressurized cylinder 102. The pressurized air in pressurized cylinder 102 pushes cutter body 136 upward (e.g., in the y-direction) and away from pressurized cylinder 102, allowing the air to exit pressurized cylinder 102 into manifold 112 and out through air outlet 140. In various embodiments, air outlet 140 may be connected to an inflatable slide, an inflatable raft, or an oxygen system, among other applications.

Figure 2B:
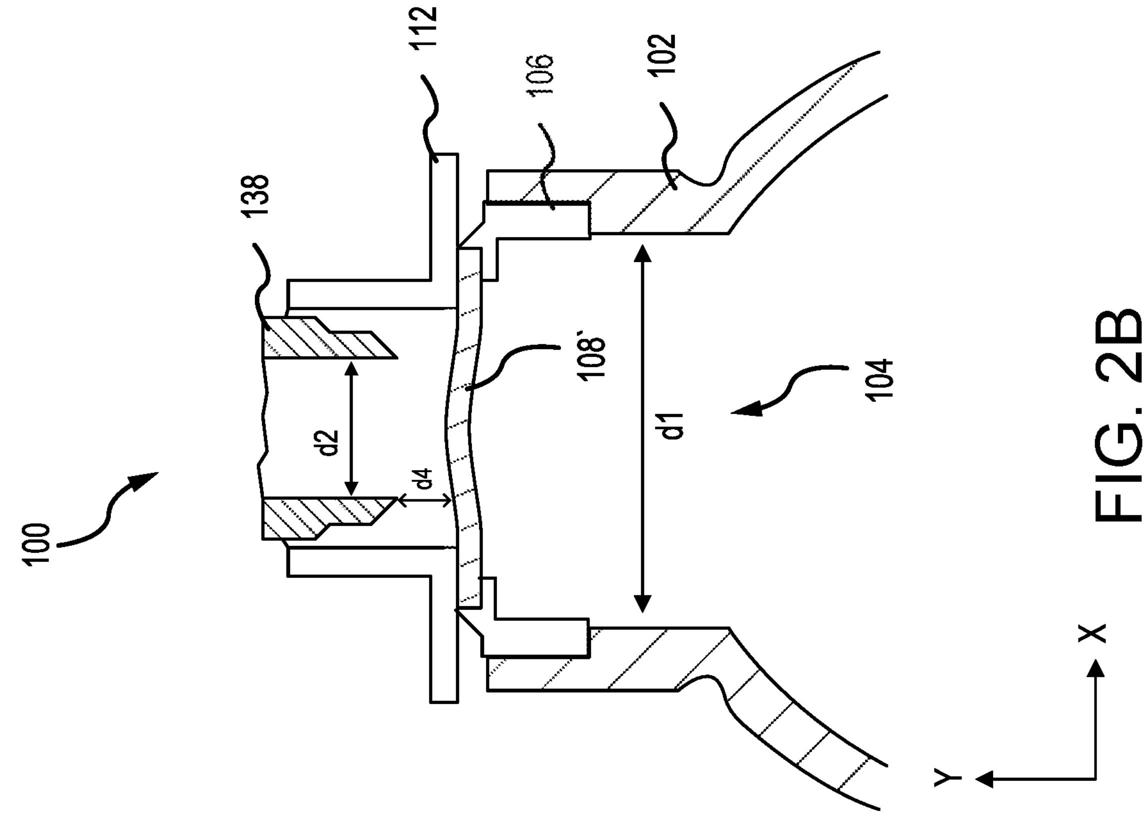
FIGS. 2A and 2B illustrate a fracture disk connected to a pressurized cylinder, in accordance with various embodiments.
Figure 2A:
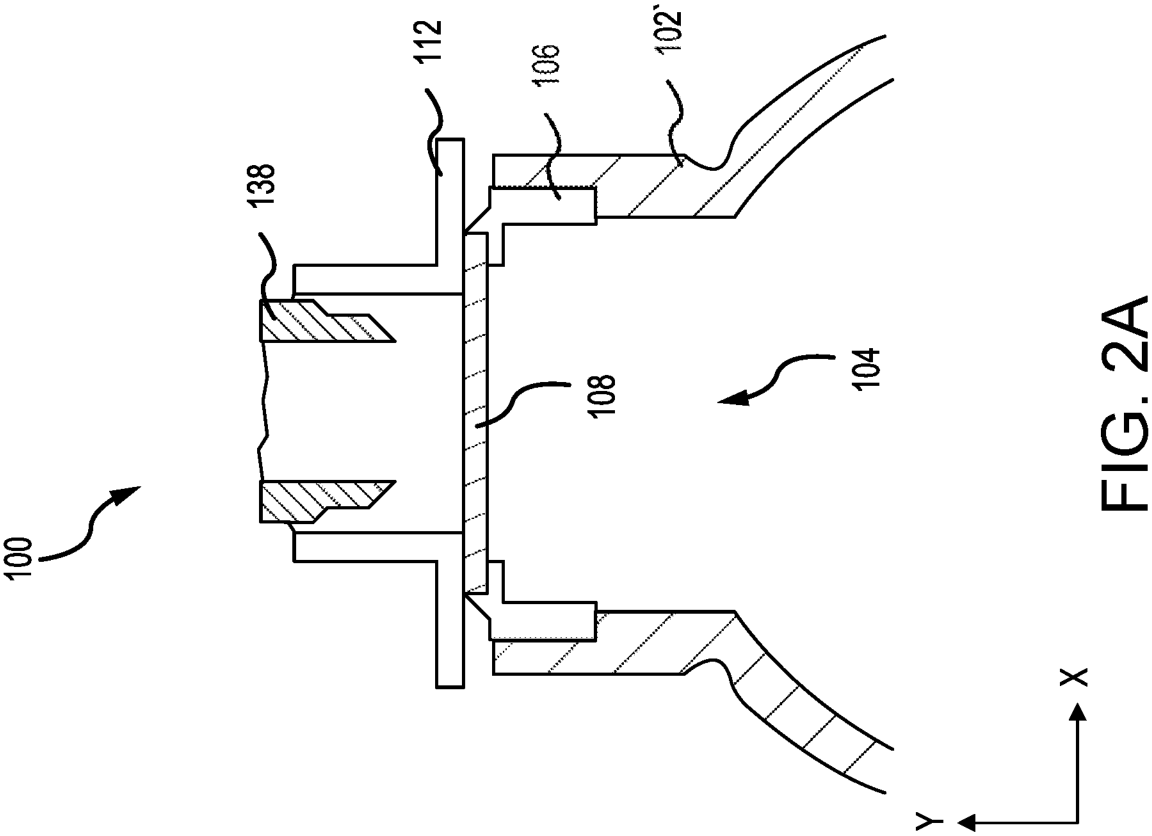

Referring now to FIGS. 2A and 2B, in accordance with various embodiments, close up cross section views of actuation device 100 connected to pressurized cylinder 102 are illustrated. FIG. 2A illustrates fracture disk 108, including metal insert 106, connected to opening 104 of a cylinder 102' that is in an unpressurized condition, that is, before being pressurized. In the depicted embodiments, metal insert 106 is a unitary piece that extending around the circumference of opening 104 and is connected to cylinder 102' as described above. Fracture disk 108 extends over (e.g., in the y-direction) metal insert 106 and is connected to metal insert 106, as described above. There is no force exerted on fracture disk 108 before cylinder 102' is pressurized, therefore fracture disk 108 remains horizontal with respect to opening 104 (e.g., in the x-plane).

FIG. 2B illustrates fracture disk 108', including metal inserts 106, connected to opening 104 of pressurized cylinder 102 in a pressurized condition, that is, after being pressurized. As illustrated, fracture disk 108' may bulge, or expand, away from pressurized cylinder 102 (e.g., in the y-direction). In the pressurized condition, fracture disk 108' is in a deformed condition and a maximum amount of stress on fracture disk 108' is in the central region, as indicated by the bulge. Because the pressure on fracture disk 108' and the result bulge, cutting edge 138 is a distance d4 from fracture disk 108', where distance d4 is less than distance d3. Accordingly, as described above, distance d2 separates cutting edges 138 provides a gap between cutting edges 138 to avoid inadvertently contacting fracture disk 108'. It should be noted that as diameter d1 of pressurized cylinder 102 increases, the bulge at the center of fracture disk 108' may increase, further reducing distance d4 between fracture disk 108' and cutting edges 138.

Figure 3B:
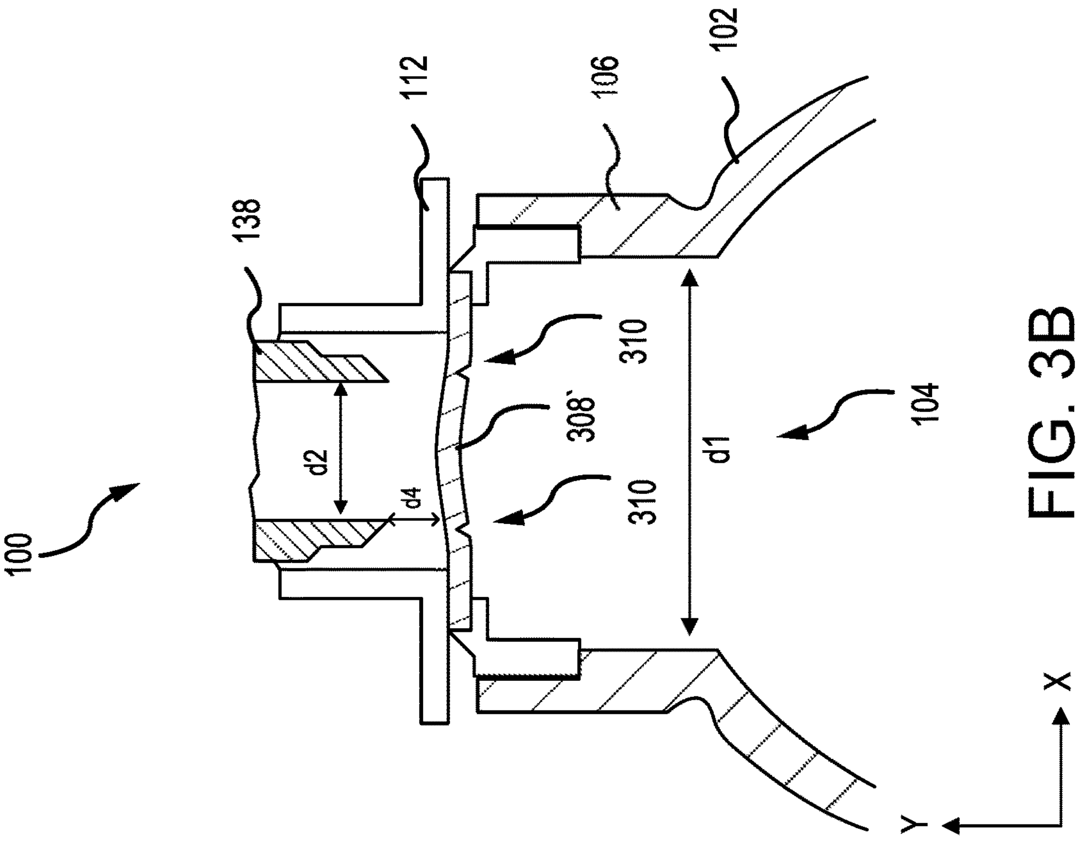
FIGS. 3A and 3B illustrate a fracture disk including notches connected to a pressurized cylinder, in accordance with various embodiments.
Figure 3A:
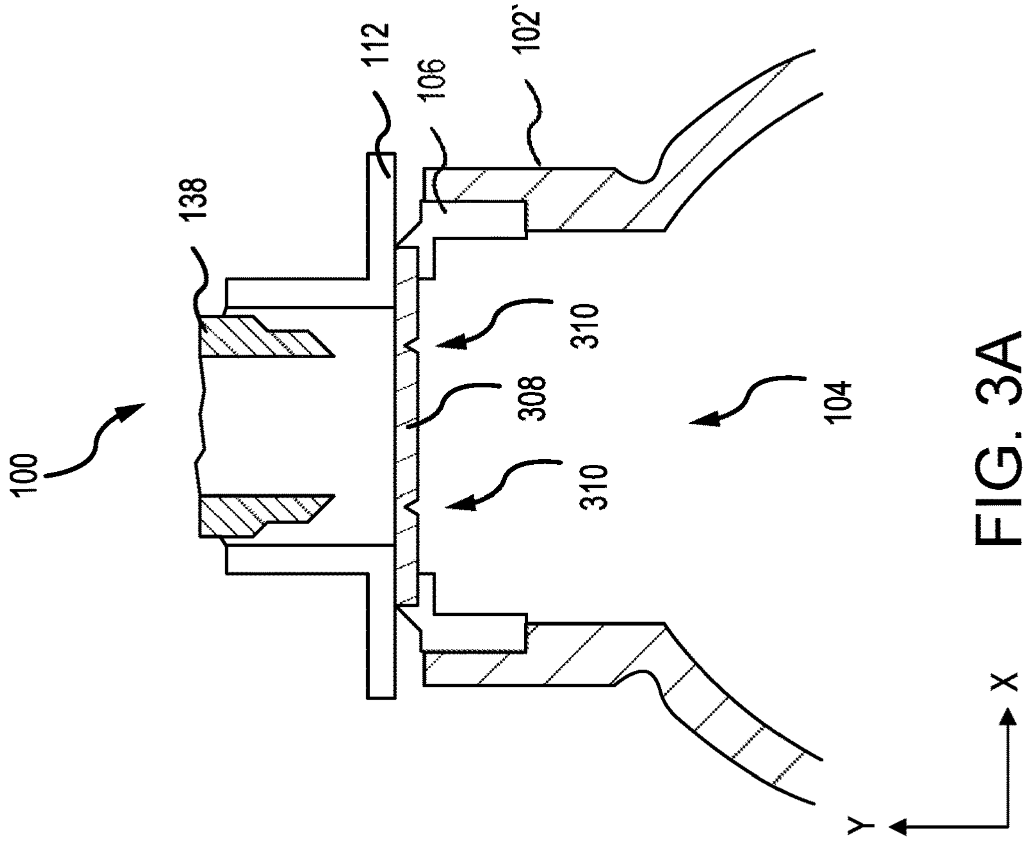

Referring now to FIGS. 3A and 3B, in accordance with various embodiments, close up cross section views of actuation device 100 connected to pressurized cylinder 102 are illustrated. FIG. 3A illustrates a fracture disk 308 including notches 310 formed therein connected to cylinder 102' in the unpressurized condition. In the depicted embodiment, two notches 310 formed in a bottom surface of fracture disk 308 (e.g., the negative y-direction). In various embodiments, any number of notches 310 may be formed in the bottom surface of the fracture disk 308. In various embodiments, notches 310 may extend about 10% to about 50% of the thickness of fracture disk 308, and more specifically, about 20% to about 30% of the thickness of fracture disk 308. In various embodiments, notches 310 may be formed as inverted "V" shaped along a diameter of fracture disk 308. In various embodiments, notches 310 may be formed as conical shaped in various locations around fracture disk 308. In various embodiments, notches 310 may be rectangular, or another shape. Notches 310 reduce the cutting force used to rupture fracture disk 308. As illustrated, notches 310 are vertically below (e.g., in the negative y-direction) cutting edges 138, further reducing the cutting force used to rupture fracture disk 308.

FIG. 3B illustrates a fracture disk 308' including notches 310 formed therein connected to pressurized cylinder 102 in the pressurized condition. As described above, with respect to FIG. 2B, the force from pressurized cylinder 102 may cause bulging, or bowing, of fracture disk 308'. Notches 310 have little to no effect on the integrity of fracture disk 308' allowing fracture disk 308' to remain intact until punctured by cutting edges 138.

Figure 4A:
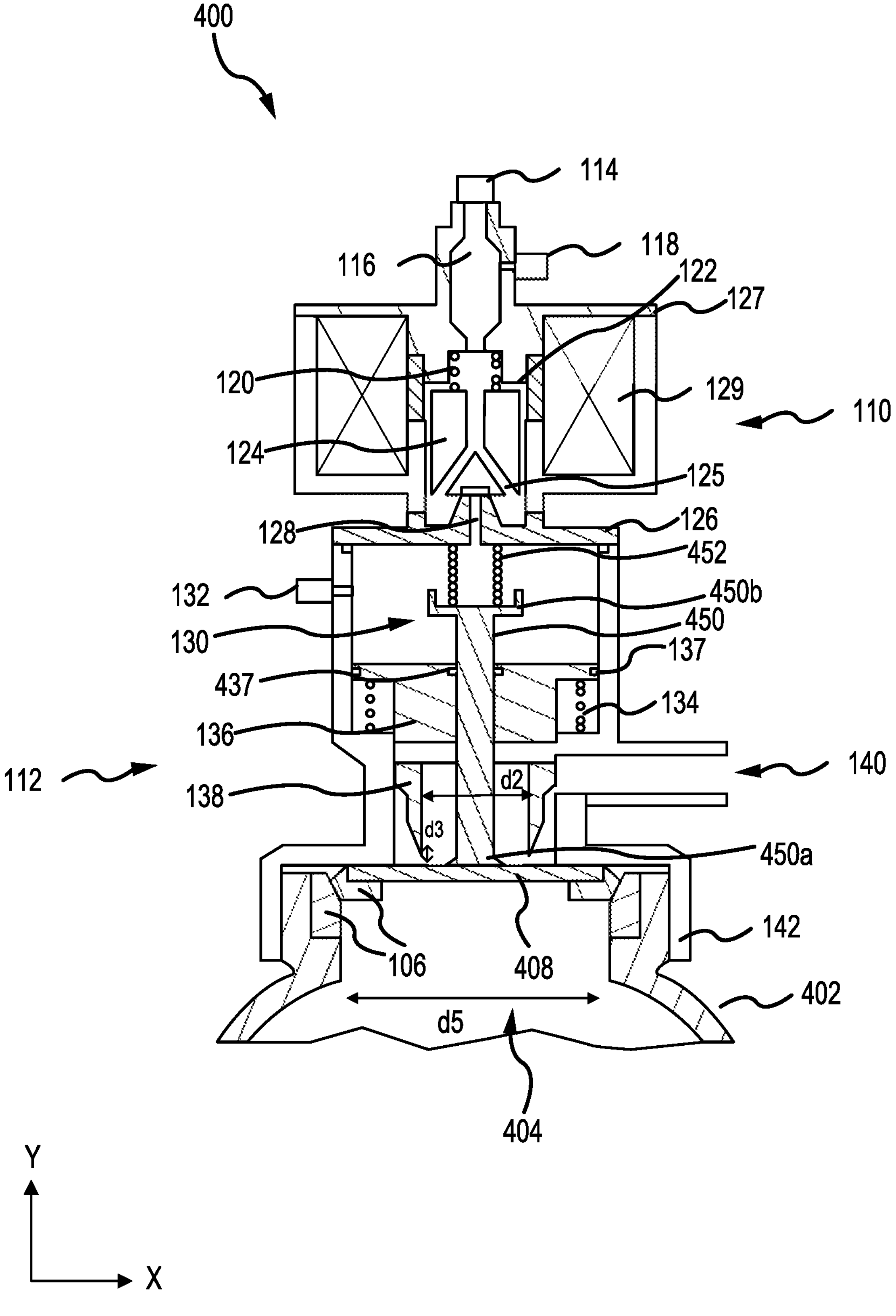
FIGS. 4A and 4B illustrate an actuation device for opening a pressurized cylinder, in accordance with various embodiments.
Figure 4B:
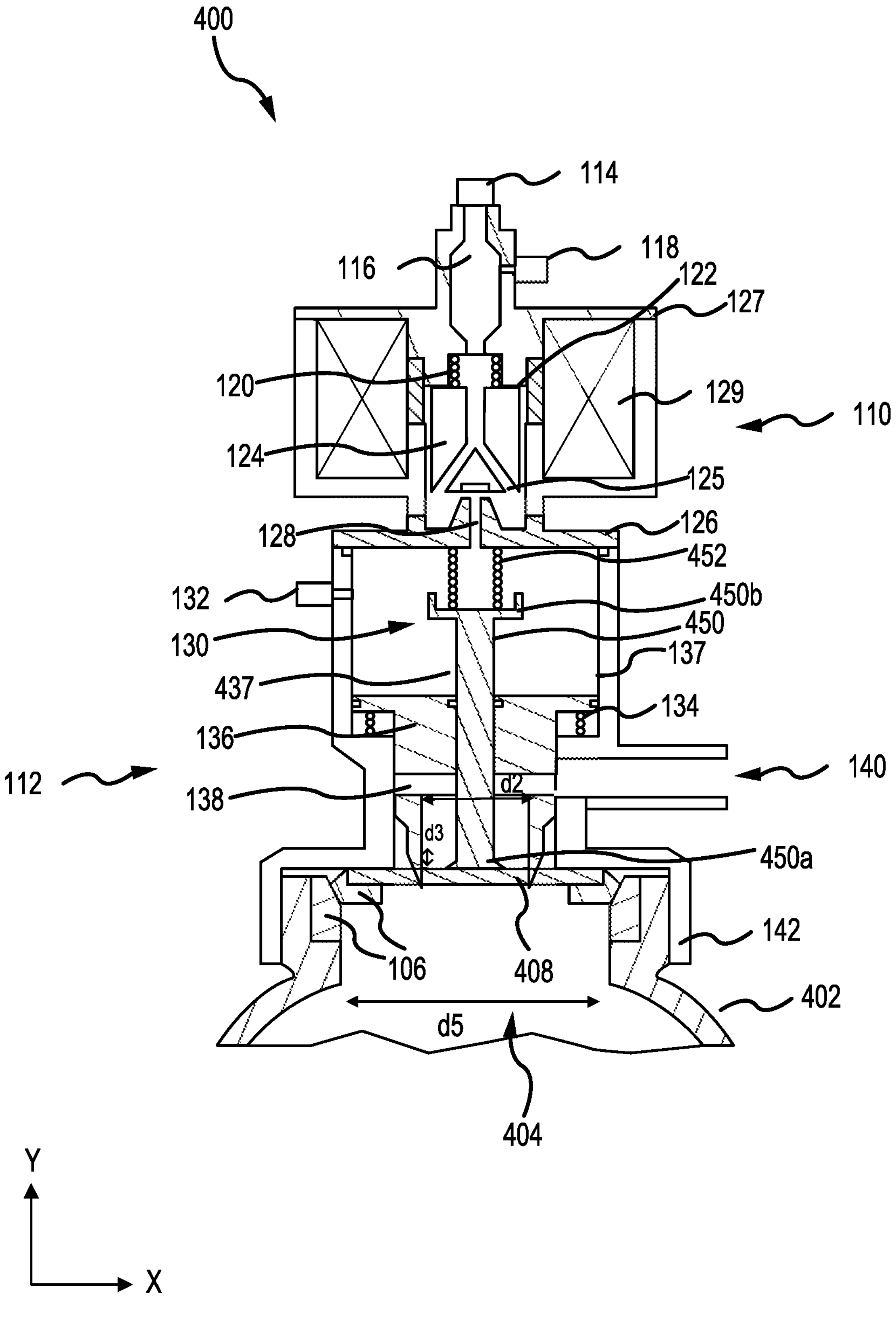

Referring now to FIGS. 4A and 4B, in accordance with various embodiments, an actuation device 400 for opening a pressurized cylinder 402 is illustrated. Actuation device 400 includes similar components to those described above with respect to actuation device 100 referenced in FIGS. 1A and 1B, including pressure cartridge 110 and manifold 112 and their respective corresponding components. Actuation device 400, similar to actuation device 100, is connected to pressurized cylinder 402 as described above. Description of repeated components may not be repeated here. Pressurized cylinder 402 has an opening 404 that is sealed by a fracture disk 408. Opening 404 has a diameter d5 that is greater than diameter d1 of opening 104. Accordingly, fracture disk 408 is larger than fracture disk 108. The increased diameter d5 of opening 404 and increased size of fracture disk 408 may result in bulging of fracture disk 408 as described above with respect to FIGS. 2B and 3B.

Actuation device 400 further includes a central stem 450 extending through cutter body 136 and in between cutting edges 138 to counteract any bulging that may occur in fracture disk 408. Central stem 450 includes a bottom portion **450*a* that is in contact with an upper surface of fracture disk 408. Central stem 450 further includes an upper portion 450*b* that is in contact with a spring 452. Spring provides a downward force (e.g., in the negative y-direction) on central stem 450 causing central stem 450 to exert a downward force (e.g., in the negative y-direction) on fracture disk 408. An O-ring seal 437 may be placed between central stem 450 and cutter body 136 to seal actuation chamber 130** and prevent gas from leaking through during actuation.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An actuator for opening a hermetically sealed cylinder, comprising:
- an actuation chamber configured to receive pressurized gas, the actuation chamber at least partially defined by a top wall and a bottom wall;
- a cutter body disposed within the actuation chamber between the top wall and the bottom wall, the cutter body including a top portion and a bottom portion;
- a cutting edge extending from the bottom portion of the cutter body;
- a spring disposed between the top portion of the cutter body and the bottom wall of the actuation chamber; and
- a pressure cartridge coupled to the actuation chamber and configured to actuate the cutter body, the pressure cartridge including:
  - a pressure cavity;
  - a fill valve configured to introduce air into the pressure cavity;
  - an air channel coupled to the actuation chamber; and
  - a plunger disposed between the pressure cavity and the air channel, the plunger configured to seal the air channel when in a closed position and to allow pressurized air to flow through the air channel into the actuation chamber in an open position.

2. The actuator for opening a hermetically sealed cylinder of claim 1,
- wherein the actuation chamber is further defined by a sidewall extending from the top wall to the bottom wall and circumferentially around the cutter body, and
- wherein the top portion of cutter body contacts the sidewall of the actuation chamber.

3. The actuator for opening a hermetically sealed cylinder of claim 2, further comprising:
- an O-ring disposed circumferentially around the top portion of the cutter body and between the top portion of the cutter body and the sidewall of the actuation chamber.

4. The actuator for opening a hermetically sealed cylinder of claim 2, further comprising:
- a leak vent fitting extending through the sidewall and into the actuation chamber.

5. The actuator for opening a hermetically sealed cylinder of claim 1, wherein the spring is configured to move from an uncompressed state to a compressed state in response to the cutter body moving in a first direction.

6. The actuator for opening a hermetically sealed cylinder of claim 5, wherein the cutter body moves in the first direction in response to a force exerted on the top surface of the cutter body.

7. The actuator for opening a hermetically sealed cylinder of claim 1, further comprising:
- a second cutting edge extending from the bottom portion of the cutter body, the second cutting edge separated from the cutting edge by a distance.

8. A system, comprising:
- a cylinder having an opening;
- a fracture disk coupled to the cylinder and over the opening;
- an actuator configured to break the fracture disk, the actuator comprising:
  - an actuation chamber configured to receive pressurized gas, the actuation chamber is partially defined by a top wall and a bottom wall;
  - a cutter body disposed within the actuation chamber between the top wall and the bottom wall, the cutter body including a top portion and a bottom portion;
  - a cutting edge extending from the bottom portion of the cutter body and configured to break the fracture disk in response to moving in a first direction;
  - a spring disposed between the top portion of the cutter body and the bottom wall of the actuation chamber; and
- a pressure cartridge coupled to the actuation chamber and configured to actuate the cutter body, the pressure cartridge including;
  - a pressure cavity;
  - a fill valve configured to introduce air into the pressure cavity;
  - an air channel coupled to the actuation chamber;
  - a plunger disposed between the pressure cavity and the air channel, the plunger configured to seal the air channel when in a closed position and to allow pressurized air to flow through the air channel into the actuation chamber in an open position; and
  - a pressure sensor configured to monitor air pressure in the pressure cavity.

9. The system of claim 8, wherein the actuation chamber is further defined by a sidewall extending from the top wall to the bottom wall and circumferentially around the cutter body, and
- wherein the top portion of cutter body contacts the sidewall of the actuation chamber.

10. The system of claim 9, wherein the actuator further comprises:
- an O-ring disposed circumferentially around the top portion of the cutter body and between the top portion of the cutter body and the sidewall of the actuation chamber.

11. The system of claim 8, wherein the spring is configured to move from an uncompressed state to a compressed state in response to the pressurized gas in the actuation chamber moving the cutter body in the first direction.

12. The system of claim 8, wherein the actuator further comprises:
- a second cutting edge extending from the bottom portion of the cutter body, the second cutting edge separated from the cutting edge by a distance.

13. The system of claim 8, wherein the cylinder holds a second pressurized gas and the actuator further comprises:
- a gas outlet to vent the second pressurized gas from the cylinder in response to the fracture disk being broken.

14. A system, comprising:
- a cylinder having an opening;
- a fracture disk coupled to the cylinder and over the opening;
- an actuator configured to break the fracture disk, the actuator comprising:
  - an actuation chamber configured to receive pressurized gas, the actuation chamber is partially defined by a top wall and a bottom wall;
  - a cutter body disposed within the actuation chamber between the top wall and the bottom wall, the cutter body including a top portion and a bottom portion;

a central stem extending through the cutter body and contacting the fracture disk;

a cutting edge extending from the bottom portion of the cutter body and configured to break the fracture disk in response to moving in a first direction; and a spring disposed between the top portion of the cutter body and the bottom wall of the actuation chamber.

15. The system of claim 14, wherein the actuator further comprises:

a second cutting edge extending from the bottom portion of the cutter body, wherein there is a distance between the cutting edge and the second cutting edge.

16. The system of claim 15, wherein the central stem further extends between the cutting edge and the second cutting edge.

17. The system of claim 14, wherein the actuator further comprises:

a compression spring disposed between the central stem and the top wall of the actuation chamber.

18. The system of claim 14, wherein the fracture disk further comprises:

a notch formed in a bottom surface of the fracture disk, the notch configured to be inline with the cutting edge.

19. The system of claim 14, wherein the cutter body is configured to move independent of the central stem.

* * * * *